UNITED STATES PATENT OFFICE.

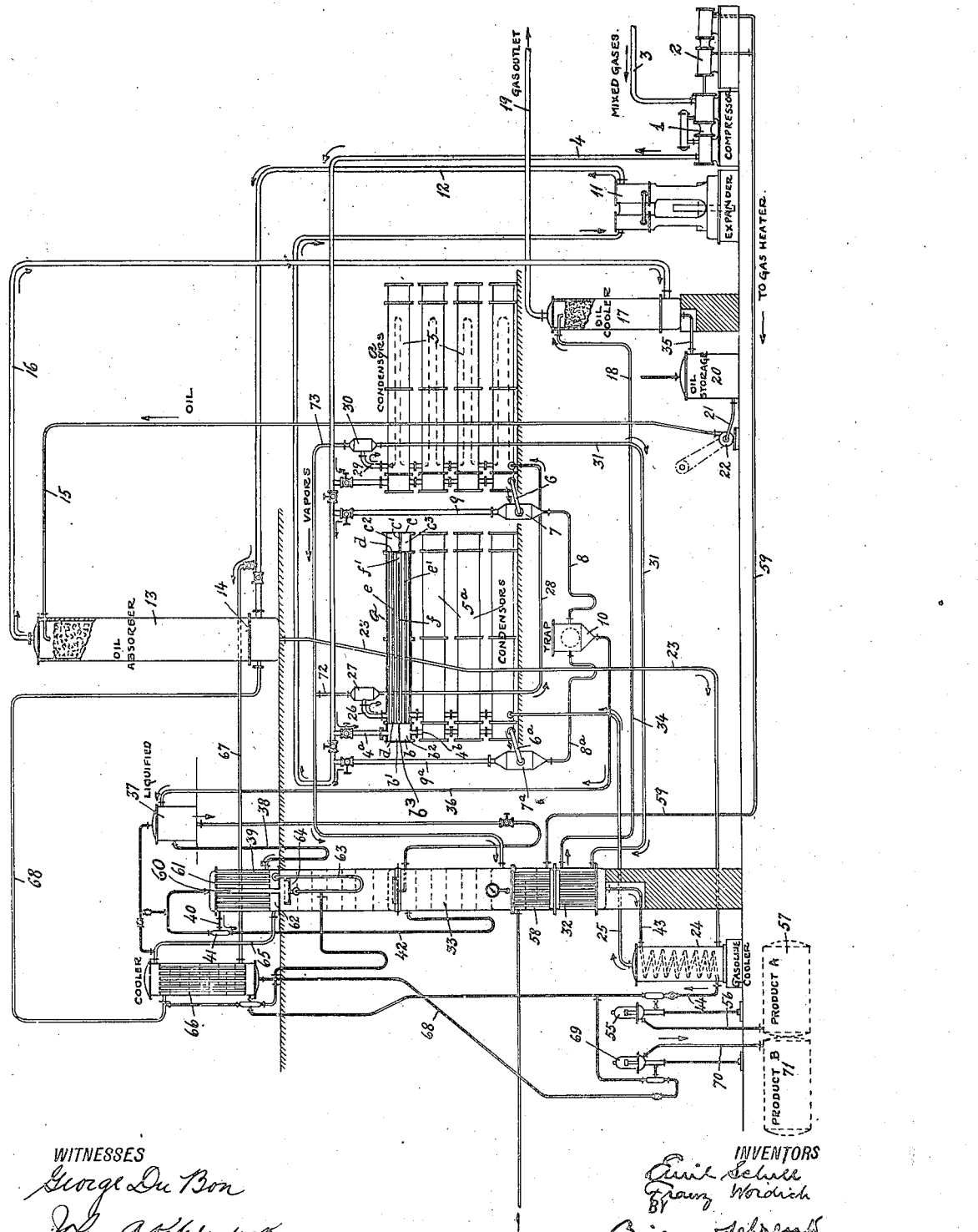

EMIL SCHILL AND FRANZ WOIDICH, OF NEW YORK, N. Y., ASSIGNORS TO CONTINENTAL GAS COMPRESSING CORPORATION, OF NEW YORK, N. Y., A CORPORATION OF NEW YORK.

PROCESS OF AND APPARATUS FOR EXTRACTING, LIQUEFYING, AND SEPARATING LIQUEFIABLE CONSTITUENTS OF GASES.

1,415,058.   Specification of Letters Patent.   Patented May 9, 1922.

Application filed April 9, 1917. Serial No. 160,642.   REISSUED

*To all whom it may concern:*

Be it known that we, EMIL SCHILL, a citizen of Wurttemberg, Germany, and FRANZ WOIDICH, a citizen of Austria, both residents of New York city, county and State of New York, have invented certain new and useful Improvements in Processes of and Apparatus for Extracting, Liquefying, and Separating Liquefiable Constituents of Gases, of which the following is a specification.

The invention relates to the extraction, liquefaction and separation of liquefiable constituents of gases and deals primarily with hydrocarbons, although it is also applicable to gases of many other varieties, and has for its object to provide a simple process whereby this may be efficiently accomplished. The improvement further contemplates the provision of a simple apparatus whereby said process may be efficiently carried out. Other objects of our invention will appear from the description and the features of novelty will be pointed out in the appended claims.

In the accompanying drawing we have shown an example of our improved apparatus, in diagrammatic form, for illustrative and descriptive purposes and similarly for illustrative purposes the description will be directed to a gas mixture the components of which are hydrocarbons.

The gas mixture containing the hydrocarbons to be separated from each other and to be partly liquefied, and coming from the source of supply, for instance the head of an oil well, or a storage tank, or a pipe line, after having been freed—in a scrubber—from impurities such as dust, oil, water and other substances carried along mechanically by the gas, enters the compressor 1, 2, through a pipe 3 and is compressed therein to such a degree of pressure as the particular gas to be treated demands. The compressed gas leaves the compressor through a pipe 4 which communicates with a system of horizontal tubular condensers 5. The compressed gas mixture flows through the tubes of the condensers in counter current to the cooling medium, which fills the shells of the condensers and the spaces between the tubes thereof. In passing through the condenser system 5 part of the liquefiable products, contained in the original gas, will be condensed.

The mixture consisting of partly liquefied and partly gaseous hydrocarbons, leaves condenser system 5 at the bottom through a pipe 6, which connects with a separator 7. The liquefied hydrocarbons will leave the separator 7 at the bottom through pipe 8, whereas that part of the original gas, which has not yet been liquefied in the condenser system 5, leaves the separator 7 at the top through pipe 9, which connects with the condenser system $5^a$. The latter also consists of a number of condensers similar to the condenser system 5. In the condenser system $5^a$ some more of the liquefiable hydrocarbons, contained in the original gas, will become liquefied. The individual condensers forming part of each system 5 and $5^a$ each comprise a tank $a$ closed at its ends and divided into interior end chambers $b$ and $c$ by means of transverse partitions $d$. The chamber $b$ is in turn divided into two separate parts $b'$ and $b^2$ by means of a partition $b^3$ while a sieve, screen or the like $c'$ divides the chamber $c$ into two parts $c^2$ and $c^3$. The screen $c'$ is provided with a large number of relatively minute apertures so that the gases and vapors flowing therethrough are evenly divided and do not acquire any tendency to select only certain of the passages provided for their travel but flow uniformly with equal pressure and relatively equal content through all the passages whereby the full benefit of temperature transfers from the oil system to be hereinafter described is uniformly obtained. Tubes $e$ extend between the partitions $d$ and establish communication between the portions $b'$ and $c^2$ of the chambers $b$ and $c$ respectively while similar tubes $e'$ extend between said partitions $d$ and establish communication between the portions $c^3$ and $b^2$ of the chambers $c$ and $b$ respectively. A branch $4^a$ extends from the pipe 4 to the portion $b'$ of the chamber $b$ while the portion $b^2$ of said chamber is provided with an outlet $4^b$ which in the present case is connected with the portion $b'$ of the chamber $b$ of the next condenser in the system. Each condenser is also provided with a partition $f$ which extends lengthwise between the tubes $e$ and $e'$ and either terminates at a distance from the one partition $d$ (near $c'$) or is apertured, the result in either case being an opening $f'$. Each condenser is further provided with an inlet and outlet pipe communicating with the spaces between the tubes $e$ and $e'$ on opposite sides of the partition $f'$ respectively. After having gone through the condenser system $5^a$ the mixture consisting of hydrocarbons liquefied in the condenser system $5^a$, and hydrocarbons still in gaseous form, leaves the condenser system $5^a$ through a pipe $6^a$, which connects with a separator $7^a$.

The liquefied hydrocarbons pass from the separator $7^a$ at the bottom through a pipe $8^a$, which connects with a condensation trap 10, with which the pipe 8 coming from the separator 7 is also connected.

Such hydrocarbons as have not yet been liquefied in condenser $5^a$, leave separator $7^a$ at the top through pipe $9^a$ leading to the gas expander 11.

Should it be found that all the liquefiable products contained in the original gas are not liquefied in condenser system 5 and condenser system $5^a$, additional condenser systems can be used, all working in the manner described.

Before following the course of the products liquefied in the condenser systems, we will follow the gas, which, as shown above, passes through pipe $9^a$ and finally reaches the expander 11, said gas being still under substantially the same pressure obtained in compressor 1—2.

In the expander 11 consisting as usual, of a cylinder or cylinders offering resistance or doing work and operating in general like a steam cylinder the pressure of the gas will be operatively utilized and in consequence, according to well-known physical laws, the temperature of the gas will drop far below zero.

The expanded cold gas leaves the expander 11 through a pipe 12, which connects with the lower part of an oil absorber 13, and will rise in the latter after having passed through a grate plate 14 in order to become finely divided. In the oil absorber 13 the cold gas will come into direct contact with the absorption medium (oil) entering the upper part of the oil absorber 13, through a pipe 15. The oil flowing down and meeting the up-coming cold gas, will absorb therefrom any such liquefiable hydrocarbons, which have not been condensed and removed in the condenser systems 5 and $5^a$. The now "dry" gas leaves the oil absorber 13 at the top through pipe 16, which connects with the lower part of the oil cooler 17. In the oil cooler 17 the cold gas will absorb heat from the oil flowing down from the top and entering through pipe 18, and will leave the oil cooler 17 at the top through pipe 19. The gas leaving the whole system through pipe 19, is now free from any liquefiable products and can be used for illuminating, heating and other purposes.

The absorbing medium (oil) mentioned above enters the system for instance from an oil storage tank 20 through a pipe 21 connecting with the oil circulating pump 22, which pumps the oil through pipe 15 into the upper part of oil absorber 13, mentioned above. As described above, the oil going through oil absorber 13 absorbs there, from the gases entering oil absorber 13 through pipe 12, such liquefiable products which have not been condensed in condenser systems 5 and $5^a$.

The cold oil leaves oil absorber 13 at the bottom through pipe 23, which connects with gasoline cooler 24, in which the oil serves as cooling medium. It leaves gasoline cooler 24 at the top through pipe 25 which connects with the last condenser of condenser system $5^a$.

The oil, which, as shown above, through heat exchange in oil cooler 17, with the expanded cold gases, has obtained a very low temperature, is now used in the condenser systems 5 and $5^a$, as a cooling medium for the condensation of the gas mixture coming from compressor 1, 2. The cold oil passes the condensers between the shells and the coils in counter current fashion and while it acts as cooling medium therein, naturally takes up part of the heat from the hot gases going through the tubes of the condensers.

The oil leaves the condenser system $5^a$ through pipe 26 connecting with separator 27.

On account of the higher temperature at which the oil leaves condenser system $5^a$, part of the hydrocarbons, which have been absorbed by the oil in oil absorber 13, will have evaporated again, and in order to separate the oil from such vapors, separator 27 is provided. The oil leaves the bottom of separator 27 through pipe 28, which connects with the lowest condenser of condenser system 5.

While the temperature of the oil entering condenser system 5 is higher than the one at which it entered condenser system $5^a$, the oil is still cold enough to serve as cooling medium in condenser system 5. The oil leaves condenser system 5 at the top through pipe 29 connecting with separator 30, which serves the same purpose as separator 27, namely to separate the oil from such hydrocarbons, which had originally been absorbed in the oil absorber 13, and which on account of the higher temperature of the oil in condenser system 5, have evaporated again.

The oil which leaves separator 30 has now, through heat exchange in the condenser system, obtained its highest temperature. It leaves separator 30 at the bottom through pipe 31, which connects with the oil heater 32 at the bottom of rectification column 33. The purpose of the oil heater 32 will be explained later on.

The oil leaves oil heater 32 through pipe 34, which connects with the top of the above mentioned oil cooler 17, where the hot oil, through the direct contact with the cold gas entering oil cooler 17 at the bottom through pipe 16, will be cooled down to such an extent that the oil will be cold enough to serve as cooling medium in the above described manner. The cold oil leaves oil cooler 17 through pipe 35, which connects with the oil storage tank 20 from where it enters the system again in the above described manner.

The application of the oil in connection with the apparatus, serves the following purposes:

1. The absorption of such liquefiable hydrocarbons contained in the original gas mixture, which neither by compression, nor by cooling, nor by a combination of both, can be recovered in liquid form.

2. As carrier of such hydrocarbons not liquefied in the condensers to a point where such absorbed hydrocarbons will be vaporized and, therefore, separated again.

3. As cooling medium in the condenser system, where the liquefaction and condensation of the original hot gas, coming from the compressor, takes place.

4. As heating medium in the rectification column for the fractional separation of the mixture of liquid hydrocarbons obtained in the whole system, according to their respective boiling points.

We now go back to the above mentioned condensation trap 10, where the condensates coming from the condenser system 5, 5ª, are collected. The condensation trap 10 is built on the well-known principle of a steam trap and serves the purpose of continuously removing the liquid condensates. The condensates leaving the condensation trap 10, are still under a high enough pressure to be lifted to any height within the hydrostatic limits of the original pressure. The bottom of the condensation trap 10 through pipe line 36, connects with the upper part of a regulating pot 37.

The liquefied hydrocarbons collect in the regulating pot 37 until the liquid reaches the outlet of pipe 38, which connects the regulating pot 37 with the dephlegmator 39 on top of the rectification column 33. The dephlegmator 39 is constructed in the form of a tubular condenser. The liquid hydrocarbons coming from regulating pot 37 are used in dephlegmator 39 as a cooling medium, which flows around the condenser tubes, and leave dephlegmator 39 through pipe 40 at a considerable higher temperature than the one at which they entered the dephlegmator 39 through pipe 38. The pipe 40 connects with a separator 41 which acts in the same manner as described above for separators 7, 7ª, etc. The liquid runs down through a pipe 42 into the middle of rectification column 33, from where it flows down, passing a distributor, in a finely divided form, until it reaches oil heater 32, where a certain part of the liquid hydrocarbon mixture will be evaporated, necessary for the separating effect in the rectification column 33.

The evaporated hydrocarbons on the other hand will rise in the rectification column 33, into direct contact with the liquid hydrocarbons, pre-heated in the dephlegmator 39 and passing therefrom through pipe 40 to separator 41 and to the rectification column 33 through pipe 42. Such direct contact of the cold liquid with the warm vapors will have the following results:

1. The heavier constituents of the vapor will become liquefied again and will, therefore, drop down.

2. The lighter constituents of the vapors, however, will rise in the column without becoming liquefied.

3. The lighter constituents of the liquid will evaporate and join the vapors mentioned in No. 2, and will rise together with them in the column.

4. The heavier constituents of the liquid will flow down and join the liquefied constituents mentioned in No. 1. The result of the process in the rectification column 33 will be a practically quantitative separation of the light liquefiable hydrocarbons from the heavier ones, according to the well-known principles of separation and distillation by means of rectification columns.

Such hydrocarbons which will not evaporate in oil heater 32 will collect at the bottom of rectification column 33 and leave the same through pipe 43, which connects with the coil of the gasoline cooler 24, cooled by the cold oil coming from oil absorber 13 through pipe line 23. From the gasoline cooler 24 the now cold gasoline, passes through pipe 44 and enters test cup 55. The test cup 55 is equipped with a hydrometer for determining the specific gravity of the liquid, with a thermometer for the determination of the temperature of the liquid, and with an automatic flow scale for the measurement of the quantity of the liquid passing through test cup 55. From the test cup 55 the gasoline passes through a pipe 56, and flows into the gasoline storage tank 57.

By observing the temperatures and the hydrometer readings and maintaining them at the predetermined points for the product desired by the operation of suitable valves in the pipe lines controlling the flow of the respective fluids (the lighter or heavier fractions) the product ultimately recovered in the tank 57 (or 71) will be uniform in quality notwithstanding variations in temperature or pressure or other conditions in the dephlegmator or in the cooling or heating system. The product desired may be either lighter or heavier and the arrangement is such that whatever fraction is determined upon at the outset, or at any particular period of operation, may be recovered by merely controlling the valves of the liquid systems 44, 55 (or 68, 69) until the thermometer and hydrometer readings correspond to the indications for the particular product which is desired.

In case the oil heater 32 provided in the lower part of the separating column 33 should not furnish a high enough temperature, particularly in winter, an additional gas heater 58 is provided. The necessary heating medium for the gas heater 58 is taken from the exhaust gases coming out of the explosion chamber of the engine, which is used for driving the compressor 1—2, said combustion gases being conducted to said gas heater 58 through a pipe 59. We now have to go back to the vapors rising up in rectification column 33. Said vapors will finally reach dephlegmator 39, cooled as described above, by the cold liquid hydrocarbon mixture coming from regulating pot 37.

The vapors rise through pipe 60 until they get into the upper chamber 61 of the dephlegmator 39. From there said vapors flow down the tubes of the dephlegmator 39 in counter current to the cooling medium entering the dephlegmator 39, as explained above, through pipe 38. The result of this operation will be the partial condensation of the vapors. The liquid part will collect in the lower chamber 62 of the dephlegmator 39 and will leave the same through pipe 63, connected with a liquid distributor 64 located in the upper part of the rectification column 33. From said distributor the liquid in a finely divided spray will flow down in the rectification column 33 and so furnish the necessary amount of liquid for carrying out rectification and separation.

The vapors, which have not been condensed in the tubes of dephlegmator 39 will leave the upper part of the lower chamber 62 through a pipe 65, which connects with the upper part of a cooler 66. As a cooling medium for cooler 66, part of the expanded cold gas, coming from expander 11 is used by connecting pipe 12 with cooler 66 through the medium of a pipe line 67. The cooling medium leaves cooler 66 at the top through pipe 68, which connects with the bottom of oil absorber 13. The liquefied light hydrocarbons condensed in cooler 66 will leave the cooler at the bottom through pipe 68, leading to test cup 69 constructed in the same manner as described for gasoline test cup 55. Through a pipe 70 the liquid leaves the test cup 69 leading into the storage tank 71, for the light liquefied products.

Such liquefiable hydrocarbons, which have been absorbed by an absorbing medium (oil) in the oil absorber 13, as seen above, have been evaporated again from the absorbing medium, while the latter passed through the condenser system 5 and $5^a$. To separate the vapors from the absorbing medium, we have seen above, that separator 27 is provided when the absorbing medium leaves condenser system $5^a$, and separator 30 when the absorbing medium leaves condenser system 5. While the absorbing medium (oil) leaves the separators 27 and 30 at the bottom, the vapors leave the tops of the separators 27 and 30 respectively through pipes 72 and 73 and enter the lower part of rectification column 33, where they join the vapors coming from oil heater 32. In this way they will participate in the separation and liquefaction, which takes place in the rectification column 33.

Instead of using the expanded gases for cooling the oil, the latter may be cooled by other means as, for instance, by means of water, ice machine, or the like. Similarly, instead of cooling the absorbing medium by direct contact with the expanded gases, the same result may be accomplished by means of an indirect cooling system.

Absorption in an oil absorber may be accomplished either under atmospheric pressure, as described, or under the pressure obtained in the compressor. In other words, the gas leaving the condenser system $5^a$ may be piped directly into the oil absorber 13. The improved process may also be operated, though not as efficiently, by leaving out the oil absorption entirely. In this case the gas leaving the condenser system 5 would either go directly to the expander, or, if cooled by water, the gas would pass out to the atmosphere.

The absorbing system may also be used in connection with other compressing and condensing methods; in other words, the absorbing system may be attached to existing gasoline plants.

The rectification column can also be used in any other plant, where a total condensation of hydrocarbons is desired.

The separation of the different hydrocarbons according to their boiling point by means of the rectification column in combination with dephlegmators may also be used to great advantage in any existing gasoline plants where the hydrocarbons are liquefied by compression or cooling or by a combination of both.

Various changes in the specific process described and in the specific form of apparatus shown and described may be made within the scope of the claims without departing from the spirit of our invention.

We claim:

1. The process which consists in compressing a gas containing various liquefiable vapors and extracting liquefiable products therefrom, by reducing the temperature of said compressed gas, expanding the devaporized gas in a cylinder, imparting the resulting reduced temperature to a circulating liquid and using the thus cooled liquid as the means for reducing the temperature of the compressed gas.

2. The process of extracting and recovering various liquefiable vapors from gases containing the same which consists in employing a liquid circulating medium as a vehicle for both high and low temperatures causing said medium to acquire the requisite temperatures from the gases under treatment by flowing it past such gases in a compressed state and again after having been expanded in a cylinder.

3. The process of extracting and recovering various liquefiable vapors from gases containing the same which consists in compressing the said gases cooling the compressed gases and extracting the resultant liquid, expanding the remaining compressed gases in a cylinder, circulating a fluid medium in proximity to the compressed and the expanded gases and to the products extracted therefrom whereby said compressed gases become the sole means of producing both the high and low temperatures required for the extraction and recovery in liquid form of the liquefiable vapors, by reason of the transmittal from time to time to the fluid circulating medium of the temperature of said gas when in a hot compressed state and again when in a cold state after having been expanded in a cylinder, the fluid liquid medium transmitting its various temperatures, thus acquired, at the appropriate places, to the compressed gases and to the products extracted therefrom.

4. The process of extracting and recovering various liquefiable vapors from gases containing the same which consists in compressing the said gases, cooling the compressed gases and extracting the resultant liquid, expanding the remaining compressed gases in the cylinder, circulating a fluid medium in heat exchange relation with the compressed and the expanded gases and transmitting temperatures thus acquired to the compressed gases and the liquid products extracted therefrom, bringing the fluid circulating medium into contact with the expanded gases and separating from the said fluid medium liquefiable ingredients carried over from the said contact and effecting said separation by heat transmitted to the circulating fluid through its said heat exchange relation with the compressed gases whereby said compressed gases become the sole means of producing both the high and low temperatures required for the extraction and recovery in liquid form of the liquefiable vapors, by reason of the transmittal from time to time to the fluid circulating medium of the temperature of said gases when in a hot compressed state and again when in a cold state after having been expanded in a cylinder, and the transmission of temperatures, thus acquired, between the liquid medium, the gases and the products extracted therefrom.

5. The cyclic process which consists in compressing a gas containing various liquefiable vapors, extracting part of the liquefiable product out of said compressed gas by subjecting the latter in heat exchange relation to the cooling action of a fluid medium containing such absorbed vapors as are not liquefied by compressing and cooling alone, withdrawing the thus extracted liquefied products from the compressed gas thus cooled, expanding the remaining gas in a cylinder and thereby greatly lowering its temperature, passing said cold expanded gas through a finely divided fluid medium capable of absorbing uncondensed vapors remaining from said expanded gas, employing said fluid medium with its absorbed vapors cooled by the last named step as the means for effecting the extraction first mentioned, separating from said medium the absorbed vapors released by the heat acquired from the hot compressed gases, liquefying said vapors, cooling said heated and devaporized medium by means of the cold devaporized expanded gas, and circulating the liquid medium to absorb uncondensed vapors from the expanded cold gas and for the subsequent operations hereinabove described.

6. The cyclic process which consists in compressing a gas containing various liquefiable vapors, extracting part of the liquefiable product out of said compressed gas by subjecting the latter in heat exchange relation to the cooling action of a fluid medium containing such absorbed vapors as are not liquefied by compressing and cooling alone, withdrawing the thus extracted liquefied products from the compressed gas thus cooled, expanding the remaining gas in a cylinder and thereby greatly lowering its temperature, passing said cold expanded gas through a finely divided fluid medium capable of absorbing uncondensed vapors remaining from said expanded gas, employing said fluid medium with its absorbed vapors cooled by the last named step as the means for effecting the extraction first mentioned, separating from said medium the absorbed vapors released by the heat acquired from the hot compressed gases, liquefying said vapors, cooling said heated and devaporized medium by means of the cold devaporized expanded gas, combining the liquefied products and separating the same into the specific liquid end products desired by rectifying with heat supplied by the said circulating liquid medium, and circulating the liquid medium to absorb uncondensed vapors from the expanded cold gas and for the subsequent operations hereinabove described.

7. The cyclic process which consists in compressing a gas containing various liquefiable vapors, extracting part of the liquefiable product out of said compressed gas by subjecting the latter in heat exchange relation to the cooling action of a fluid medium containing such absorbed vapors as are not liquefied by compressing and cooling alone, withdrawing the thus extracted liquefied products from the compressed gas thus cooled, expanding the remaining gas in a cylinder and thereby greatly lowering its temperature, passing said cooled expanded gas through a finely divided fluid medium capable of absorbing uncondensed vapors remaining from said expanded gas, employing said fluid medium with its absorbed vapors cooled by the last named step as the means for effecting the extraction first mentioned, separating from said medium the absorbed vapors released by the heat acquired from the hot compressed gases, liquefying said vapors, cooling said heated and devaporized medium by means of the cold devaporized expanded gas, combining the liquefied products and separating the same into the specific liquid end products desired by rectifying with heat supplied by the said circulating liquid medium and cooling the rectified product by means of said circulating liquid after the same has come from contact with the expanded cold gases, and circulating the liquid medium to absorb uncondensed vapors from the expanded cold gas and for the subsequent operations hereinabove described.

8. Apparatus adapted for the recovery of liquefiable products from gases containing various liquefiable vapors consisting of a compressor for the gases, condensers for the compressed gases, means connected with said condensers for circulating a cold medium therethrough, separators connected with said condensers for removing the liquefied products, an expansion cylinder and a connection between it and the condensers, means for transmitting the cold temperature produced at the expansion cylinder to the circulating medium employed in the condensers, a rectification column, means for conveying the separated liquid to said column, means for heating said column at one portion thereof and means for cooling the vapors at another portion thereof, and means for removing in liquid form the rectified product from said column and means for maintaining the desired grade of rectified product.

9. Apparatus adapted for the recovery of liquefiable products from gases containing various liquefiable vapors consisting of a compressor for the gases, condensers for the compressed gases, means connected with said condensers for circulating a cold medium therethrough, separators connected with said condensers for removing the liquefied products, an expansion cylinder and a connection between it and the condensers, means for transmitting the cold temperature produced at the expansion cylinder to the circulating medium employed in the condensers, a passage for the cooling medium communicating with the cold expanded gases and a passage for the said medium communicating between the last of the condensers through which it passes and the cold expanded gases aforesaid at the point in the passage of the latter after the same have come from the first mentioned meeting with the said medium, a rectification column, means for conveying the separated liquid to said column, means for heating said column at one portion thereof and means for cooling the vapors at another portion thereof, and means for removing in liquid form the rectified product from said column and means for maintaining the desired grade of rectified product.

10. An apparatus adapted for the recovery of liquefiable products from gases containing various liquefiable vapors, said apparatus comprising in combination a compressor for the gases, a pipe for conducting the compressed gases from the compressor, a shell with which said pipe communicates, horizontally arranged tubes in said shell to afford a passage for said gases, a partition also in the shell between said tubes to cause the gases to flow in one direction through a part of said tubes and in the opposite direction through the remaining part of said tubes, a numerously and minutely apertured member arranged in the path of said gases within that part of the shell where the direction of the gases changes, a chamber within said shell surrounding said tubes for circulating a cooling fluid, an outlet from said shell for the compressed gases and liquid contained therein, a separator and a connection between said outlet and said separator, an outlet upon said separator for withdrawing the uncondensed gases and a second outlet for withdrawing the condensed liquid, a rectifying column and a connection between the liquid outlet of the separator and said rectifying column.

11. An apparatus adapted for the recovery of liquefiable products from gases containing various liquefiable vapors, said apparatus comprising in combination a compressor for the gases, a pipe for conducting the compressed gases from the compressor, a shell with which said pipe communicates, transverse partitions in said shell forming between them a closed chamber, horizontally disposed tubes supported in and extending through said partitions, a horizontal partition extending between the tubes from one of the said vertical partitions and terminating short of the other of said vertical partitions, a further horizontal partition in the shell outside of said closed chamber in the path of the incoming gases to compel them to flow through a part of the tubes in one direction and through the remaining part of the tubes in the opposite direction, a numerously and minutely apertured member in the path of the gases where their direction changes, an inlet into the closed chamber for a cooling medium upon one side of the partition therein and an outlet for the cooling medium at a corresponding point at the opposite side of said closed chamber and horizontal partition to compel said cooling medium to flow in directions opposite to that of the gases in the respective tubes wherein the gases flow in reverse directions, an outlet for said shell for the compressed gases and liquid contained therein, a separator and a connection between said outlet and said separator, an outlet upon said separator for withdrawing the uncondensed gases and a second outlet for withdrawing the condensed liquid, a rectifying column and a connection between the liquid outlet of the separator and said rectifying column.

In testimony whereof we have hereunto set our hands.

EMIL SCHILL.
FRANZ WOIDICH.